US011108927B2

United States Patent
Morita

(10) Patent No.: US 11,108,927 B2
(45) Date of Patent: Aug. 31, 2021

(54) IMAGE READING DEVICE, IMAGE FORMING APPARATUS AND IMAGE READING SYSTEM

(71) Applicant: KYOCERA Document Solutions Inc., Osaka (JP)

(72) Inventor: Takuro Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/108,215

(22) Filed: Dec. 1, 2020

(65) Prior Publication Data

US 2021/0168252 A1 Jun. 3, 2021

(30) Foreign Application Priority Data

Dec. 3, 2019 (JP) .............................. JP2019-218882

(51) Int. Cl.
*G06K 15/00* (2006.01)
*H04N 1/00* (2006.01)
*H04N 1/44* (2006.01)
*H04N 1/10* (2006.01)

(52) U.S. Cl.
CPC ..... *H04N 1/00697* (2013.01); *H04N 1/00037* (2013.01); *H04N 1/00079* (2013.01); *H04N 1/00551* (2013.01); *H04N 1/00729* (2013.01); *H04N 1/00771* (2013.01); *H04N 1/1061* (2013.01); *H04N 1/4433* (2013.01)

(58) Field of Classification Search
CPC ........... H04N 1/00697; H04N 1/00037; H04N 1/00079; H04N 1/00551; H04N 1/00729; H04N 1/00771; H04N 1/1061; H04N 1/4433
See application file for complete search history.

(56) References Cited

U.S. PATENT DOCUMENTS 4,879,574 A * 11/1989 Nakamura ............. G03G 15/50
399/17
2006/0171726 A1 8/2006 Noda et al.

FOREIGN PATENT DOCUMENTS

JP 2006-208973 A 8/2006

\* cited by examiner

*Primary Examiner* — Moustapha Diaby
(74) *Attorney, Agent, or Firm* — Studebaker & Brackett PC

(57) ABSTRACT

An image reading device includes a reading part, a document pressing part, a capacitance sensor, a controller and an informing part. The capacitance sensor detects a capacitance varying in response to opening and closing of the document pressing part and presence or absence of the document on a document placement face. The controller determines that the document pressing part is disposed in the closing position and that the document is placed on the document placement face, based on a detection result of the capacitance sensor. The informing part informs a user of leaving the document on the document placement face behind in a case where the controller determines that the document placement part is disposed in the closing position and the document is placed on the document placement face after a predetermined time elapses from a completion of an image reading in the reading part.

6 Claims, 9 Drawing Sheets

IMAGE READING DEVICE, IMAGE FORMING APPARATUS AND IMAGE READING SYSTEM

INCORPORATION BY REFERENCE

This application is based on and claims the benefit of priority from Japanese patent application No. 2019-218882 filed on Dec. 3, 2019, which is incorporated by reference in its entirety.

BACKGROUND

The present disclosure relates to an image reading device, an image forming apparatus and an image reading system.

A copying machine sometimes includes a discharge tray on which a discharged sheet is held and a document pressing member which is manually opened and closed. The copying machine is provided with an opening/closing state detection sensor which detects whether the document pressing member is opened or closed, a discharged sheet detection sensor which detects whether the discharged sheet is held on the discharge tray, and an informing means which informs a user of leaving the document behind. The informing means informs the user of leaving the document behind when a copying operation is completed and it is determined that the discharged sheet is taken out from the discharge tray while the document pressing member is not opened based on detection signals of the two sensors.

In the above described technique, when the opening/closing state sensor detects that the document pressing member is opened, it is determined that the document is taken out from the discharge tray. However, the opening/closing state sensor cannot directly detect presence or absence of the document on a document table.

SUMMARY

In accordance with an aspect of the present disclosure, an image reading device includes a reading part, a document pressing part, a capacitance sensor, a controller and an informing part. The reading part reads an image of a document placed on a document placement face. The document pressing part is openable and closable between a closing position where the document is pressed on the document placement face by the document pressing part and an opening position where the document is permitted to be removed from the document placement face. The capacitance sensor is provided in the document pressing part and detects a capacitance varying in response to opening and closing of the document pressing part and presence or absence of the document on the document placement face. The controller determines that the document pressing part is disposed in the closing position and that the document is placed on the document placement face, based on a detection result of the capacitance sensor. The informing part informs a user of leaving the document on the document placement face behind in a case where the controller determines that the document placement part is disposed in the closing position and the document is placed on the document placement face after a predetermined time elapses from a completion of an image reading in the reading part.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference the attached drawings, one embodiment of the present disclosure will be described. "Fr", "Rr", "L", "R", "U" and "D" respectively show "front", "rear", "left", "right", "upper" and "lower". In the specification, although the terms showing a direction and a position are used, they are used only for convenience of explanation and does not limit the technical scope of the present disclosure.

Figure 1:
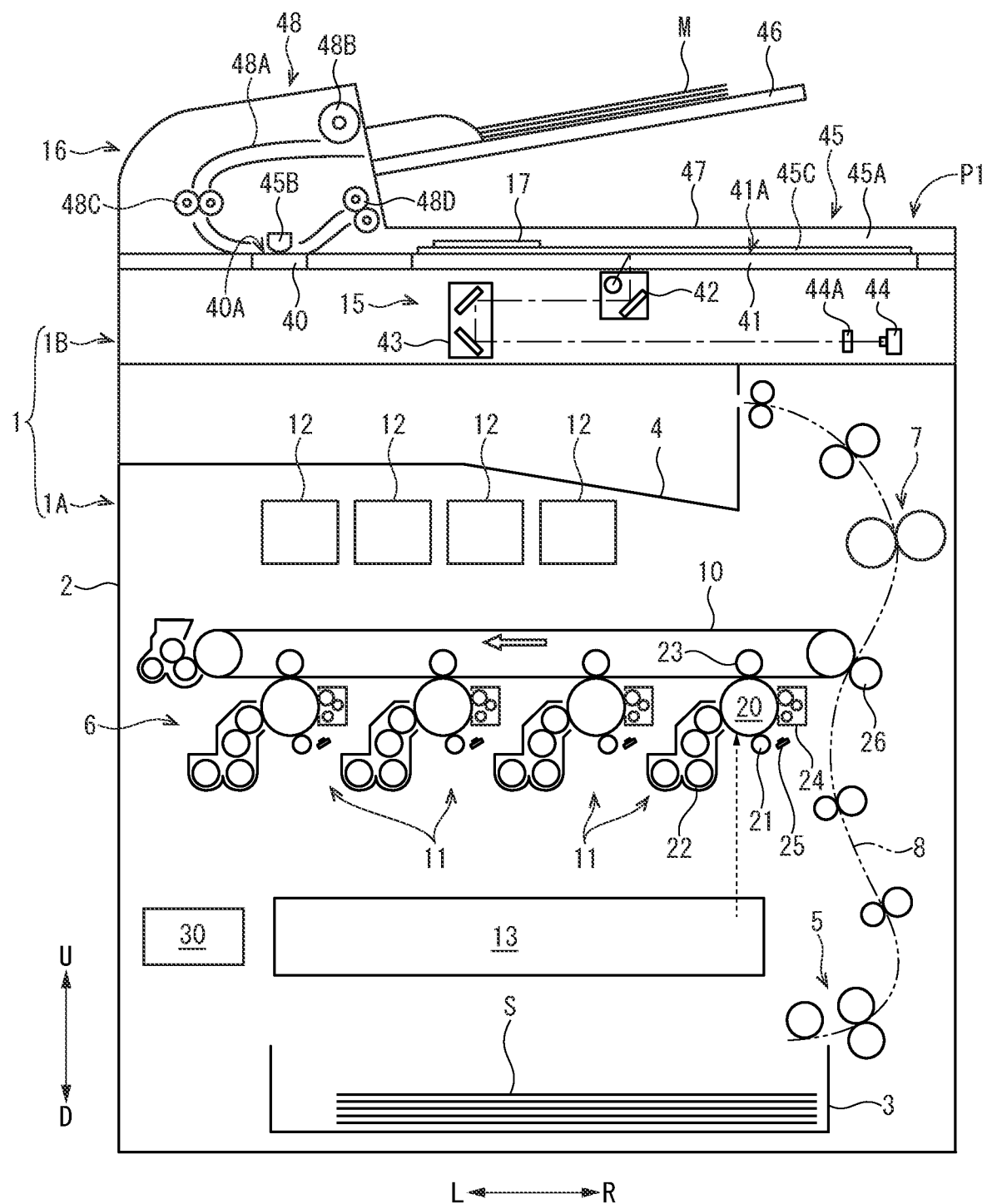
FIG. 1 is a view (a front view) schematically showing an inner structure of an image forming apparatus according to one embodiment of the present disclosure.
Figure 2:
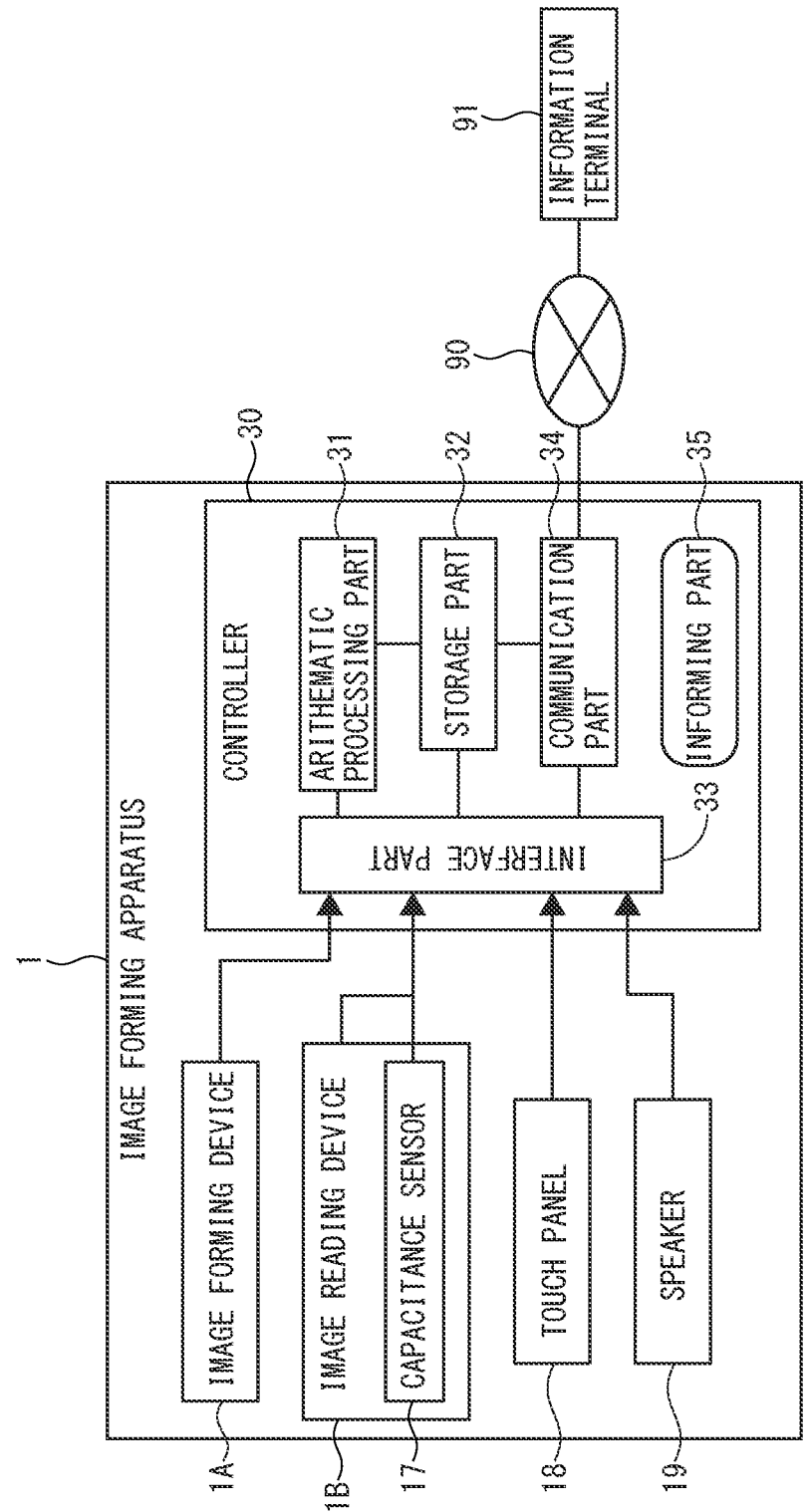
FIG. 2 is a block diagram showing the image forming apparatus according to the embodiment of the present disclosure.
Figure 3:
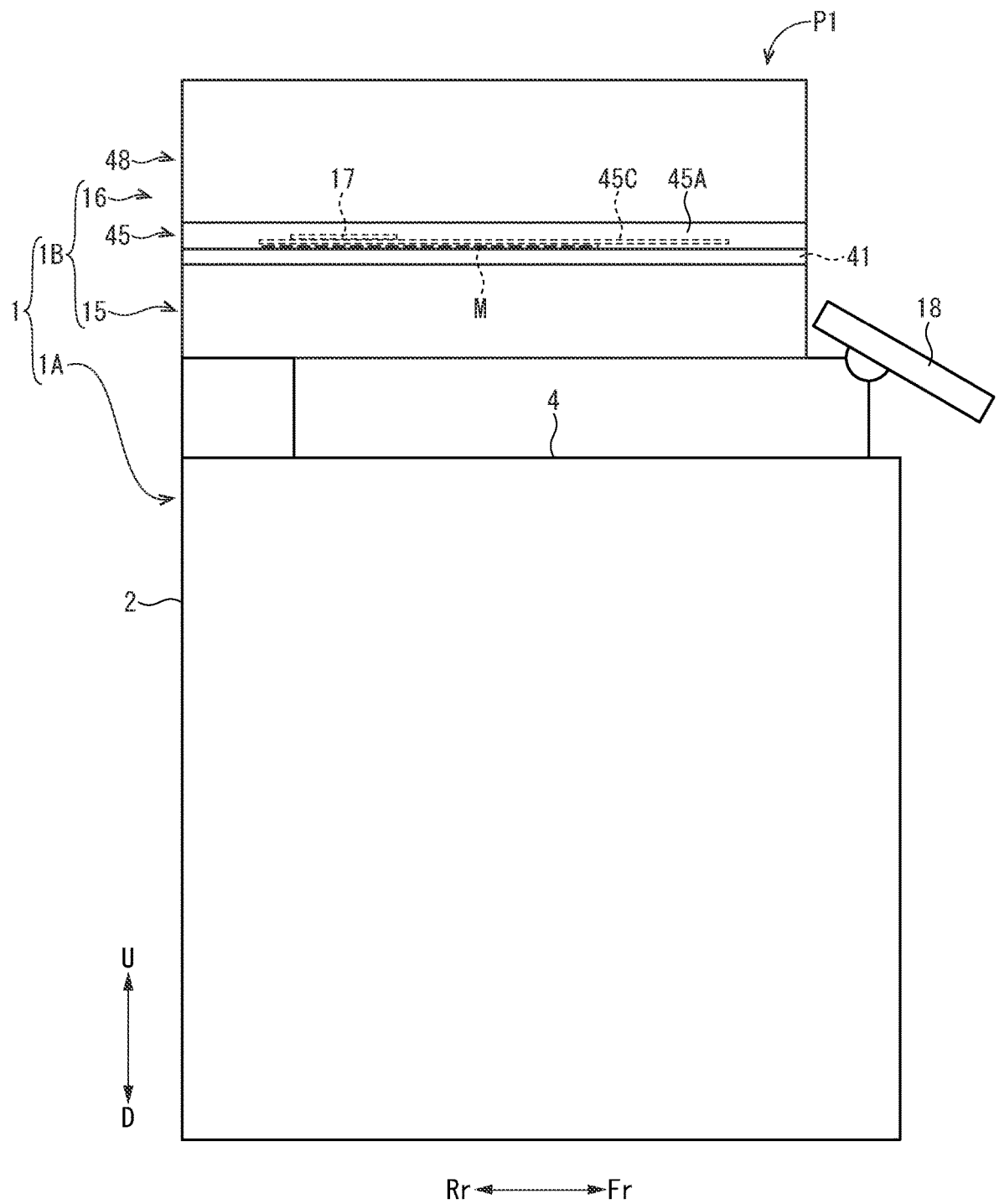
FIG. 3 is a side view showing a document pressing part disposed in a closing position, in the image forming apparatus according to one embodiment of the present disclosure.
Figure 4:
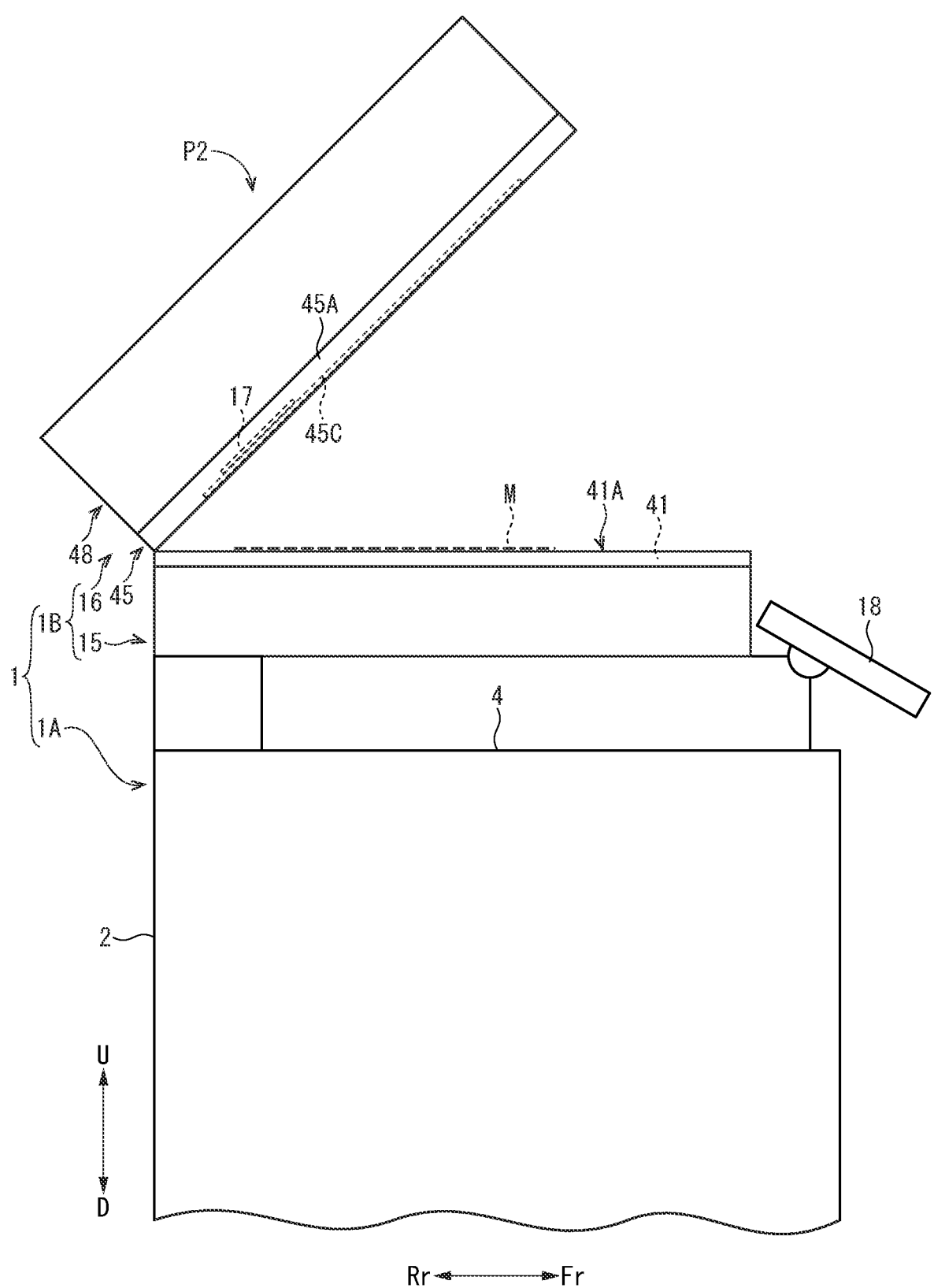
FIG. 4 is a side view showing the document pressing part disposed in an opening position, in the image forming apparatus according to one embodiment of the present disclosure.

With reference to FIG. 1 to FIG. 4, an image forming apparatus 1 will be described. FIG. 1 is a view (a front view) schematically showing an inner structure of the image forming apparatus 1. FIG. 2 is a block diagram showing the image forming apparatus 1. FIG. 3 is a side view showing a document pressing part 45 disposed in a closing position P1. FIG. 4 is a side view showing the document pressing part 45 disposed in an opening position P2.

[Outline of the image forming apparatus] As shown in FIG. 1, the image forming apparatus 1 includes an image forming device 1A and an image reading device 1B. The image forming device 1A is a device which forms an image on a sheet S (a medium) in an electrophotographic manner. The image reading device 1B is a device which reads an image of a document M optically and converts the read image into a digital data. The image forming apparatus 1 is provided with a controller 30 which controls the image forming device 1A and the image reading device 1B suitably.

[The image forming device] The image forming device 1A includes a device main body 2 forming an approximately parallelepiped outer appearance. In the lower portion of the device main body 2, a sheet feeding cassette 3 is detachably attached. In the sheet feeding cassette 3, a paper sheet S (or a bundle of the sheets S) is stored. On the upper face of the device main body 2, a discharge tray 4 is provided, on which the sheet S on which the image is formed is received. The sheet S is not limited to a paper sheet, and may contain a resin film, an OHP sheet or the others.

The image forming device 1A further includes a sheet feeding part 5, an image forming part 6 and a fixing part 7 which are provided inside the device main body 2. The sheet feeding part 5 is provided in an upstream portion of a conveyance path 8 extending from the sheet feeding cassette 3 to the discharge tray 4. The fixing part 7 is provided in the downstream portion of the conveyance path 8, and the image forming part 6 is provided on the conveyance path 8 between the sheet feeding part 5 and the fixing part 7.

The image forming part 6 includes an intermediate transferring belt 10, four image forming units 11, four toner containers 12 and an exposure unit 13. The intermediate transferring belt 10 is disposed below the discharge tray 4. The four image forming units 11 are disposed below the intermediate transferring belt 10 side by side in the left-and-right direction. The four toner containers 12 are disposed above the intermediate transferring belt 10. The exposure unit 13 is disposed below the four image forming units 11.

Each image forming unit 11 includes a photosensitive drum 20, a charging device 21, a development device 22, a primary transferring roller 23, a cleaning device 24 and an erasing device 25. The four image forming units 11 have the same structure, and one of the four image forming units 11 will be described below.

The photosensitive drum 20 is driven by a motor (not shown) to be rotated while coming into contact with the lower face of the intermediate transferring belt 10. The charging device 21, the development device 22, the primary transferring roller 23, the cleaning device 24 and the erasing device 25 are disposed around the photosensitive drum 20 in order of an image forming process. The primary transferring roller 23 is disposed so as to face the photosensitive drum 20 from the upper side across the intermediate transferring belt 10. A secondary transferring roller 26 comes into contact with the right side portion of the intermediate transferring belt 10.

The four toner containers 12 contain replenishment toners (developers) of four colors (yellow, magenta, cyan and black). The four toner containers 12 communicate with the four development devices 22 through replenishment pipes (not shown), and supply the replenishment toners to the four development devices 22.

As shown in FIG. 2, the controller 30 includes an arithmetic processing part 31, a storage part 32, an interface part 33, a communication part 34 and an informing part 35.

The arithmetic processing part 31 executes an arithmetic processing according to program stored in the storage part 32. The storage part 32 contains a random access memory (RAM), a read only memory (ROM) and an auxiliary storage device such as a semiconductor drive. The storage part 32 stores program and data used for the image forming apparatus 1. To the interface part 33, the controlled devices contained in the image forming device 1A and the image reading device 1B are electrically connected. To the communication part 34, an external information terminal 91 (for example, a personal computer used by a user) and the others are connected. The arithmetic processing part 31, the storage part 32, the interface part 33 and the communication part 34 are electrically connected to each other.

An operation of the image forming device 1A will be described. The image forming device 1A forms an image (a digital data) read by the image reading device 1B (a reading part 15) on the sheet S. The image forming device 1A forms an image on the sheet S based on an image date transmitted from the information terminal 91. The controller 30 controls the image forming device 1A based on the input image data to execute an image forming processing as described below.

The charging device 21 charges the surface of the photosensitive drum 20. The exposure unit 13 exposes the photosensitive drum 20 according to the image data, and forms an electrostatic latent image on the surface of the photosensitive drum 20. The development device 22 develops the electrostatic latent image formed on the surface of the photosensitive drum 20 into a toner image by using the toner supplied from the corresponding toner container 12. The four colors toner images carried on the four photosensitive drums 20 are primarily transferred on the intermediate transferring belt 10 in order by the primary transferring rollers 23 applied with primary transferring bias. Then, a full color toner image is formed on the surface of the intermediate transferring belt 10.

On the other hand, the sheet feeding part 5 feeds the sheet S in the sheet feeding cassette 3 to the conveyance path 8. The secondary transferring roller 26 secondarily transfers the toner image on the intermediate transferring belt 10 to the sheet S passing through between the secondary transferring roller 26 and the intermediate transferring belt 10. The fixing part 7 heat-fixes the toner image on the sheet S. Then, the sheet S is discharged on the discharge tray 4. The cleaning device 24 removes a waste toner (a remaining toner) remaining on the surface of the photosensitive drum 20 after the primary transferring. The erasing device 25 emits erasing light on the photosensitive drum 20 to remove charge remaining on the photosensitive drum 20. The waste toner is collected in a collection container (not shown).

[The image reading device] As shown in FIG. 1, the image reading device 1B includes the reading part 15, an automatic document conveyance part 16 and a capacitance sensor 17. The reading part 15 is a device which reads the image of the document M placed on a document placement face 41A or the others. The automatic document conveyance part 16 is disposed on the reading part 15, and sends the document M to a document conveyance face 40A one by one automatically. The capacitance sensor 17 is provided in the automatic document conveyance part 16 (the document pressing part 45), and detects a capacitance of an object. The document M is not limited to the sheet, but may contain a booklet and a card.

<The reading part> The reading part 15 includes a contact glass 40, a platen glass 41, an optical scanning unit 42, a reflection unit 43 and an image sensor 44.

(The contact glass, the platen glass) The contact glass 40 and the platen glass 41 are fixed to the upper portion of the device main body 2 side by side in the left-and-right direction. The contact glass 40 is disposed in the left side portion of the device main body 2, and forms the document conveyance face 40A through which the document M is passed. The platen glass 41 is disposed on a right side of the contact glass 40, and forms the document placement face 41A on which the document M is placed.

(The optical scanning unit) The optical scanning unit 42 is stopped at the document conveyance face 40A, and emits light on the document M conveyed on the contact glass 40. The optical scanning unit 42 emits the light on the document M on the platen glass 41 (the document placement face 41A) while moving from the document conveyance face 40A rightward in FIG. 1. The optical scanning unit 42 emits the light on the document M placed on each of the contact glass 40 and the platen glass 41, and reads the image of the document M.

(The reflection unit) The reflection unit 43 functions to reflect the light emitted from the optical scanning unit 42 and then reflected on the document M toward a condenser lens 44A. When the optical scanning unit 42 reads the document M on the document placement face 41A, the reflection unit 43 moves in the same direction as the optical scanning unit 42 such that an optical path length between the document M and the condenser lens 44A is kept constant always.

(The image sensor) The image sensor 44 is a semiconductor element which photoelectrically inverts the light input through the condenser lens 44A. The condenser lens 44A is disposed coaxially with a light reception part of the image sensor 44. The image sensor 44 and the condenser lens 44A are fixed to a casing of the reading part 15.

The light emitted from the optical scanning unit 42 and then reflected on the document M is reflected on the reflection unit 43 and then inputs to the image sensor 44 through the condenser lens 44A. The image sensor 44 inverts a brightness of the input light into an electric signal.

<The automatic document conveyance part> The automatic document conveyance part 16 includes the document pressing part 45, a supply tray 46, a discharge tray 47 and a conveyance part 48.

(The document pressing part) The document pressing part 45 includes a pressing part main body 45A, a pressing member 45B and a pressing plate 45C. The pressing part main body 45A is formed so as to cover the glasses 40 and 41 of the reading part 15. The pressing member 45B is provided on the lower face of the pressing part main body 45A so as to face the contact glass 40. The pressing plate 45C is provided on the lower face of the pressing part main body 45A so as to face the platen glass 41.

The pressing part main body 45A is attached to the upper rear face of the device main body 2 of the image forming device 1A by a hinge (not shown). As shown in FIG. 3 and FIG. 4, the pressing part main body 45A is provided in a turnable manner around the hinge. When the front side portion of the pressing part main body 45A is lifted up, the contact glass 40 (the document conveyance face 40A) and the platen glass 41 (the document placement face 41A) are exposed. On a left side of the pressing part main body 45A, the conveyance part 48 described below is provided (refer to FIG. 1).

The pressing member 45B functions to press the document M conveyed by the conveyance part 48 on the document conveyance face 40A. The pressing plate 45C functions to press the document M on the document placement face 41A. The above described pressing part main body 45A (the document pressing part 45) is provided in an openable and closable manner between a closing position P1 (refer to FIG. 1 and FIG. 3) where it presses the document M on the document placement face 41A (and the document conveyance face 40A) and an opening position P2 (refer to FIG. 4) where it allows the document M to be removed from the document placement face 41A.

(The supply tray, the discharge tray) As shown in FIG. 1, the supply tray 46 is formed so as to extend in a right upper oblique direction from the conveyance part 48. The supply tray 46 is disposed at a position separately upward away from the pressing part main body 45A. On the supply tray 46, the document M (a bundle of the documents M) is placed. The discharge tray 47 is provided below the supply tray 46 and on the upper portion of the pressing part main body 45. In detail, the upper face of the pressing part main body 45A disposed on the platen glass 41 is formed as the discharge tray 47. On the discharge tray 47, the document M (the bundle of the documents M) passed through the conveyance part 48 is placed.

(The conveyance part) The conveyance part 48 is a device which conveys the document M on the supply tray 46 toward the reading part 15 (in detail, the document conveyance face 40A) and then discharges the document M passed through the reading part 15 on the discharge tray 47. Inside the conveyance part 48, an approximately U-shaped document conveyance path 48A is formed from the supply tray 46 to the discharge tray 47. In the upstream portion of the document conveyance path 48A, a pickup roller 48B is provided, which feeds the document M on the supply tray 46 to the document conveyance path 48A one by one. On the document conveyance path 48A, a conveyance rollers pair 48C is provided on an upstream side of the contact glass 40 (the pressing member 45B), and a discharge rollers pair 48D is provided in the downstream portion of the document conveyance path 48A.

An operation of the image reading device 1B will be described.

A case where the document M (or the bundle of the documents M) is placed on the supply tray 46 in a state where the pressing part main body 45A (the document pressing part 45) is disposed in the closing position P1 will be described. When a reading instruction is input from a user, the controller 30 controls the image reading device 1B to perform an image reading processing as follows.

The pickup roller 48B sends the document M placed on the supply tray 46 to the document conveyance path 48A, and the conveyance rollers pair 48C conveys the document M to between the contact glass 40 (the document conveyance face 40A) and the pressing member 45B. The document M is conveyed while pressed on the contact glass 40 (the document conveyance face 40A) by the pressing member 45B. The optical scanning unit 42 emits the light on the document M passing on the document conveyance face 40A, and the light reflected on the document M is input to the image sensor 44 to be converted into an electric signal. Then, the image of the document M is read as an image data. The discharge rollers pair 48D sends the document M passed through the contact glass 40 (the document conveyance face 40A) to the discharge tray 47.

Next, a case where the document M is placed on the platen glass 41A in a state where the pressing part main body 45A (the document pressing part 45) is displaced to the opening position P2 will be described. When a reading instruction is input from a user, the optical scanning unit 42 emits the light on the document M on the platen glass 41 (the document placement face 41A) while moving rightward. The light reflected on the document M is input to the image sensor 44 to be converted into an electric signal, and then the image of the document M is read as an image data.

The image data is stored in the storage part 32 of the controller 30, and the controller 30 performs the image forming operation (printing) described above. The image data may be stored in the information terminal 91 (the personal computer or the like) without being printed.

<The capacitance sensor> The capacitance sensor 17 has a transmission electrode (not shown) and a reception electrode (not shown) mounted on a single board (not shown) side by side in the left-and-right direction (or the front-and-rear direction). The capacitance sensor 17 is a mutual capacitance type sensor which detects a change in electric field between the transmission electrode and the reception electrode. The transmission and reception electrodes are electrically connected to the interface part 33 of the controller 30 (refer to FIG. 2).

As shown in FIG. 1, FIG. 3 and FIG. 4, the capacitance sensor 17 is provided between the document pressing part 45 and the discharge tray 47. In detail, the capacitance sensor 17 is fixed on the upper face of the pressing plate 45C of the document pressing part 45 with the transmission and reception electrodes toward a side of the platen glass 41 (downward). The capacitance sensor 17 is disposed at a position corresponding to a smallest readable size document M. Specifically, the capacitance sensor 17 is disposed such that when the smallest readable size sheet M is placed on the document placement face 41A, at least a part of the transmission electrode or the reception electrode is overlapped with the smallest size document M. The capacitance sensor 17 may be fixed to the pressing plate 45C with the transmission and reception electrodes upward. The capacitance sensor 17 is disposed such that the transmission and reception electrodes do not come into contact with the document M, but it may be disposed such that the transmission and reception electrodes come into contact with the document M.

By the way, a user sometimes leaves the document M placed on the platen glass 41 (the document placement face 41A) or the document M discharged on the discharge tray 47 behind after copying the document M or digitizing the document M. Then, the image forming apparatus 1 is configured to be detectable the document M left on the platen glass 41 (the document placement face 41A) or the discharge tray 47 behind by using the capacitance sensor 17.

The capacitance sensor 17 detects a capacitance varying in response to the opening and closing of the document pressing part 45 and a capacitance varying in response to presence or absence of the document M on the document placement face 41A. The capacitance sensor 17 further detects a capacitance varying in response to presence or absence of the document M on the discharge tray 47.

Figure 5:
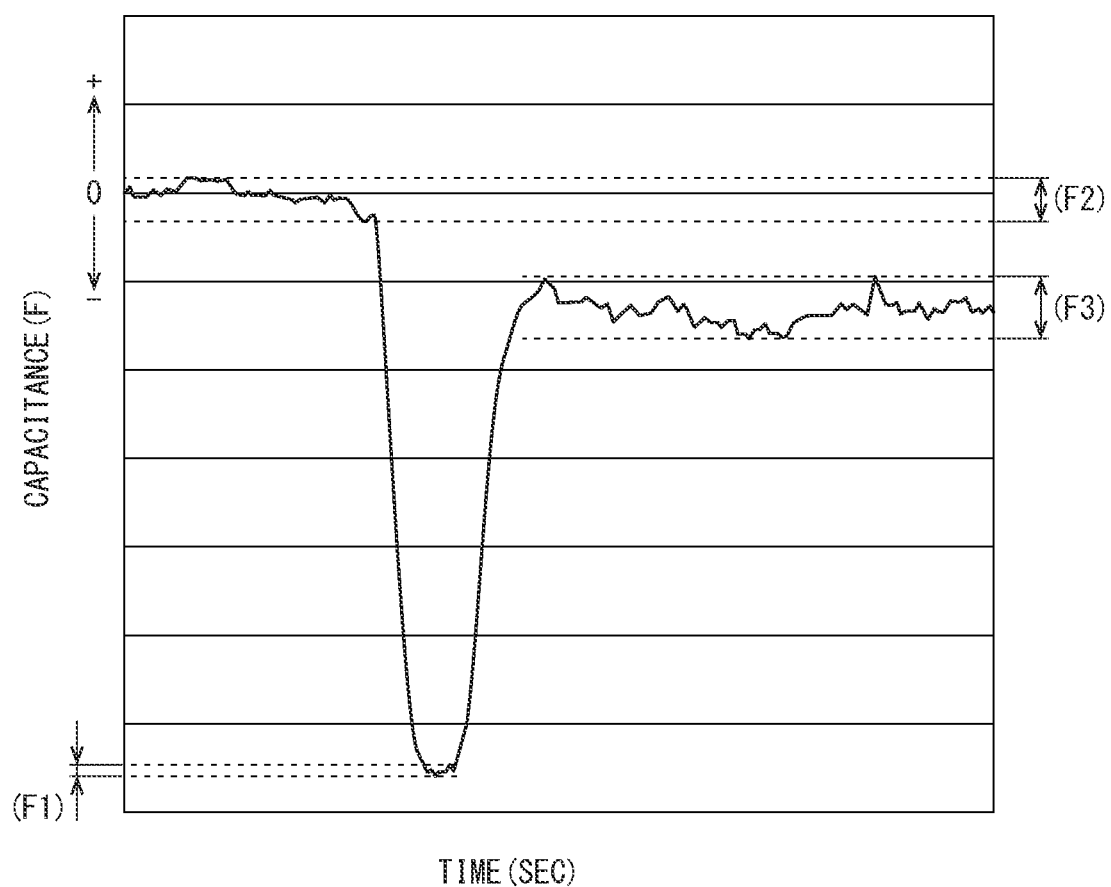
FIG. 5 is a graph showing a capacitance (on a side of a platen glass) detected by a capacitance sensor, in an image reading device according to the embodiment of the present disclosure.
Figure 6:
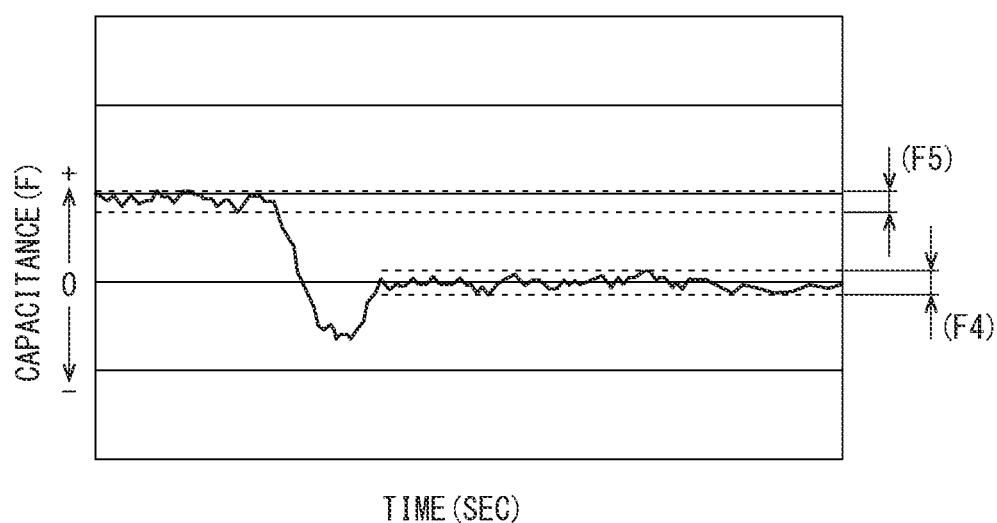
FIG. 6 is a graph showing a capacitance (on a side of a discharge tray) detected by the capacitance sensor, in the image reading device according to the embodiment of the present disclosure.

With reference to FIG. 5 and FIG. 6, a capacitance detected by the capacitance sensor 17 will be described. FIG. 5 is a graph showing a capacitance (on a side of the platen glass 41) detected by the capacitance sensor 17. FIG. 6 is a graph showing a capacitance (on a side of the discharge tray 47) detected by the capacitance sensor 17.

As shown in FIG. 5, when the document pressing part 45 is disposed in the closing position P2, the capacitance sensor 17 separates from the platen glass 41, and mainly detects a capacitance (F1) of air. On the other hand, when the document pressing part 45 is disposed in the closing position P1, a capacitance is varied in response to presence or absence of the document M on the platen glass 41 (the document placement face 41A). In a case of absence of the document M on the document placement face 41A, the capacitance sensor 17 mainly detects a capacitance (F2) of the platen glass 41. In contrast, in a case of presence of the document M on the document placement face 41A, the capacitance sensor 17 mainly detects a capacitance (F3) of the platen glass 41 and the document M. The capacitance (F3) is larger than the capacitance (F1), and the capacitance (F2) is larger than the capacitance (F3).

Furthermore, as shown in FIG. 6, in a case of absence of the document M on the discharge tray 47, the capacitance sensor 17 mainly detects a capacitance (F4) of the discharge tray 47. On the other hand, in a case of presence of the document M on the discharge tray 47, the capacitance sensor 17 mainly detect a capacitance (F5) of the discharge tray 47 and the document M. Because a low or high of the capacitance is reversed between a mounting side of the transmission and reception electrodes and an opposite side to the transmission and reception electrodes, the capacitance (F5) is larger than the capacitance (F4).

The storage part 32 of the controller 30 previously stores data corresponding to the capacitances (F1) to (F5). The capacitances (F3) and (F5) vary depending on the number of the document M, a thickness of the document M or the like, and are set not as a fixed value but as a range having upper and lower limits. Furthermore, because an output of the capacitance sensor 17 fluctuates, the capacitances (F1), (F2) and (F4) are also set as a range having upper and lower limits. Furthermore, it is assumed that the reading operation of the document M on the platen glass 41 and the reading operation of the document M on the contact glass 40 are not performed at the same time. It is also assumed that the document pressing part 45 is not turned into the opening position P2 in a state where the document M is placed on the discharge tray 47.

<The informing part> The informing part 35 (refer to FIG. 2) is implemented by the arithmetic processing part 31 of the controller 30 and the program executed by the arithmetic processing part 31. The informing part 35 is contained in the controller 30, but it may be considered to be an element of the image reading device 1B. The informing part 35 uses a touch panel 18 and a speaker 19 provided in the image forming apparatus 1 and then informs the user of leaving the document M behind.

Specifically, after a predetermined time elapses from the completion of the image reading by the reading part 15, if the capacitance sensor 17 detects that the document pressing part 45 is disposed in the closing position P1 and the document M is placed on the document placement face 41A, the informing part 35 informs the user of leaving the document M behind. Alternatively, after the predetermined time elapses from the completion of the image reading by the reading part 15, if the capacitance sensor 17 detects that the document M is placed on the discharge tray 47, the informing part 35 informs the user of leaving the document M behind. The predetermined time may be set freely to be 0 second or more. The informing the user of leaving the document M behind means, for example, that a message showing that the document M is left on the document placement face 41A or the discharge tray 47 behind is displayed on the touch panel 18 or that voice showing that the document M is left behind is generated from the speaker 19. The touch panel 18 and the speaker 19 are electrically connected to the interface part 33 of the controller 30 (refer to FIG. 2).

Figure 7:
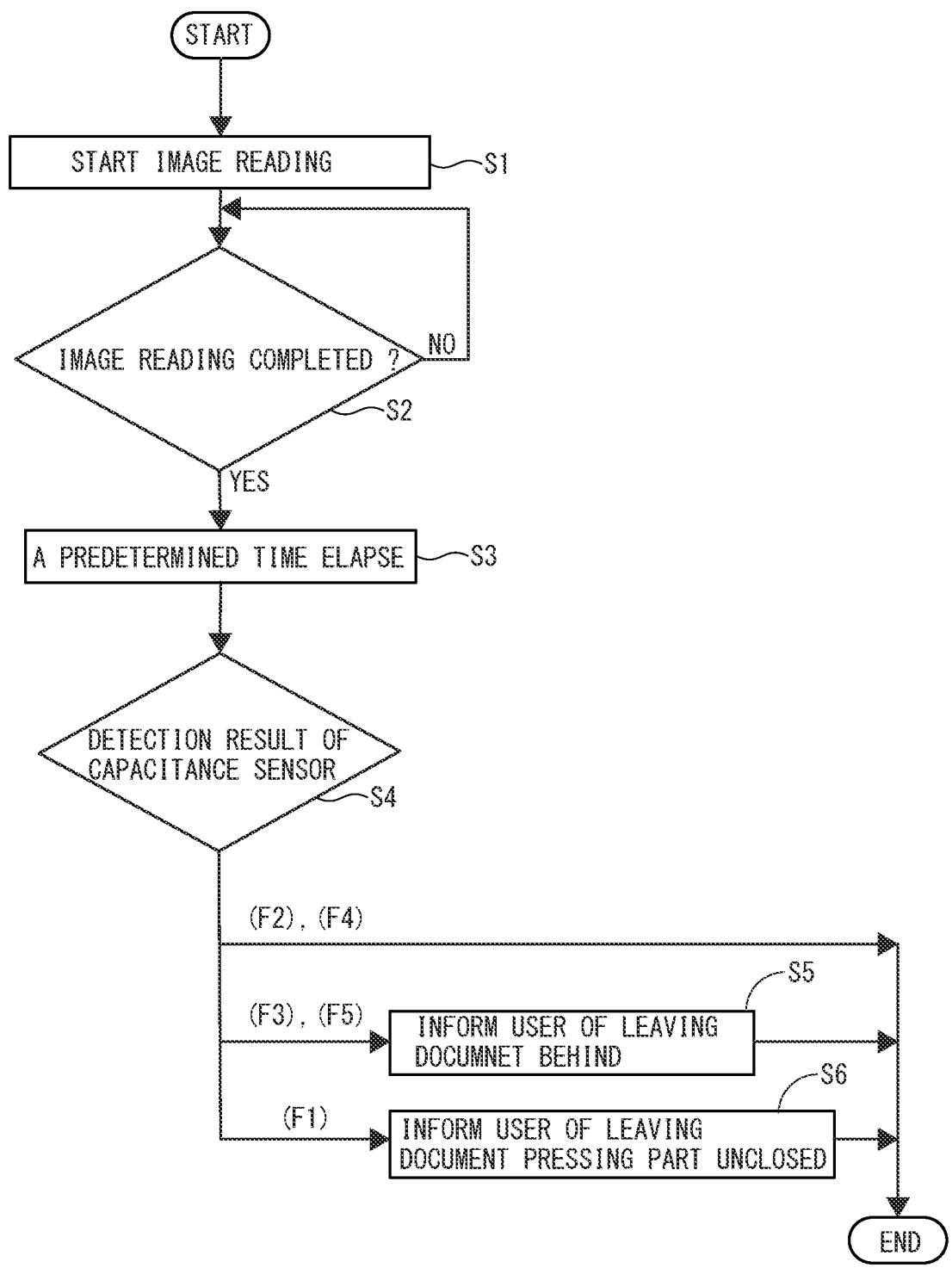
FIG. 7 is a flowchart showing a process for detecting that a document is left behind, executed in the image reading device according to the embodiment of the present disclosure.

[Detection the document left behind] With reference to FIG. 7, a process performed by the controller 30 to detect the document M left behind will be described. FIG. 7 is a flowchart showing the process performed in the image forming apparatus 1 (the image reading device 1B) to detect the document M left behind.

The controller 30 controls the image reading device 1B to start the image reading process (step S1). The controller 30 controls and monitors the image reading device 1B until the reading of the set document M is completed (NO in step S2). When the controller 30 determines that the image reading processing is completed (YES in step S2), the controller 30 obtains a detection result of the capacitance sensor 17 after the predetermined time elapses (step S3), and then, based on the detection result, determines whether the document M is left behind (step S4).

Specifically, in a case where the detection result shows the capacitance (F2) or the detection result shows the capacitance (F4), the case shows that the document pressing part 45 is disposed in the closing position P1 and the document M is not placed on the document placement face 41A and the discharge tray 47, and then the controller 30 stops detecting the document M left behind.

In a case where the detection result shows the capacitance (F3), the case shows that the document pressing part 45 is disposed in the closing position P1 and the document M is placed on the document placement face 41A, and then the informing part 35 controls the touch panel 18 or the speaker 19 to inform the user of leaving the document M behind (step S5). In a case where the detection result shows the capacitance (F5), the case shows that the document pressing part 45 is disposed in the closing position P1 and the document M is placed on the discharge tray 47, and then the informing part 35 controls the touch panel 18 and the others to inform the user of leaving the document M behind (step S5).

In a case where the detection result shows the capacitance (F1), the case shows that the document pressing part 45 is disposed in the opening position P2 and the presence or absence of the document M is unknown, and then the informing part 35 controls the touch panel 18 to display the massage or controls the speaker 19 to generate the voice and informs the user of leaving the document pressing part 45 unclosed (step S6). In this case, the process may be stopped without informing the user of leaving the document pressing part 45 unclosed.

As described above, the controller 30 makes it possible to detect the document M left behind and the informing part 35 makes it possible to inform the user of leaving the document M behind. When the next image forming processing or the next image reading processing is started, the controller 30 (the informing part 35) stops the informing the user, such as the displaying the massage on the touch panel 18.

In the above described image reading device 1B according to the present embodiment, the capacitance sensor 17 is provided in the document pressing part 45, and a capacitance detected by the capacitance sensor 17 is varied in response to presence or absence of an object in an electromagnetic field between the transmission electrode and the reception electrode of the capacitance sensor 17. Thereby, the single capacitance sensor 17 makes it possible to correctly detect the opening and closing of the document pressing part 45 and the presence or absence of the document M on the document placement face 41A. Additionally, based on the detection result of the capacitance sensor 17, it becomes possible to inform a user of leaving the document M behind.

In the image reading device 1B according to the present embodiment, because the capacitance sensor 17 is disposed between the document pressing part 45 and the discharge tray 47, a capacitance detected by the capacitance sensor 17 is varied in response to the presence or absence of the document M on the discharge tray 47. Thereby, the single capacitance sensor 17 makes it possible to detect the presence or absence of the document M on the discharge tray 47, in addition to the detection of the opening and closing of the document pressing part 45 and the presence or absence of the document M on the document placement face 41A. In the above manner, it becomes possible to detect various states containing the opening and closing of the document pressing part 45 and the presence or absence of the document M by using the single capacitance sensor 17 so that a manufacturing cost can be decreased compared with a case where a plurality of sensors is provided to detect various states.

[The image reading system] By the way, if the user gets away from the image forming apparatus 1 (the image reading device 1B) before the predetermined time elapses, it becomes impossible to inform the user of leaving the document M behind. Then, the image forming apparatus 1 may constitute the image reading system 9 which informs the user who has got away from the image forming apparatus 1 that he has left the document M behind.

Figure 8:
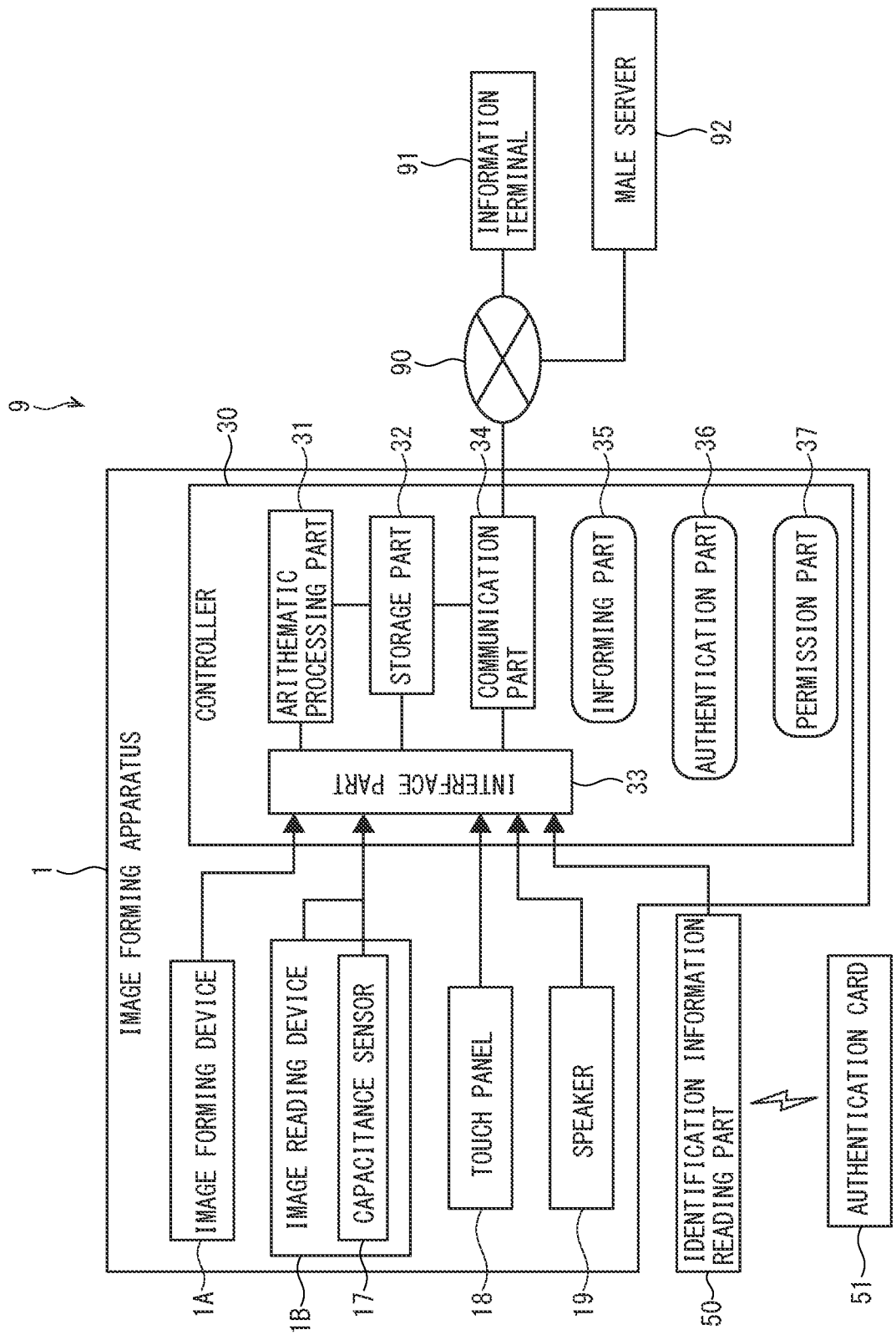
FIG. 8 is a block diagram showing an image reading system according to the embodiment of the present disclosure.
Figure 9:
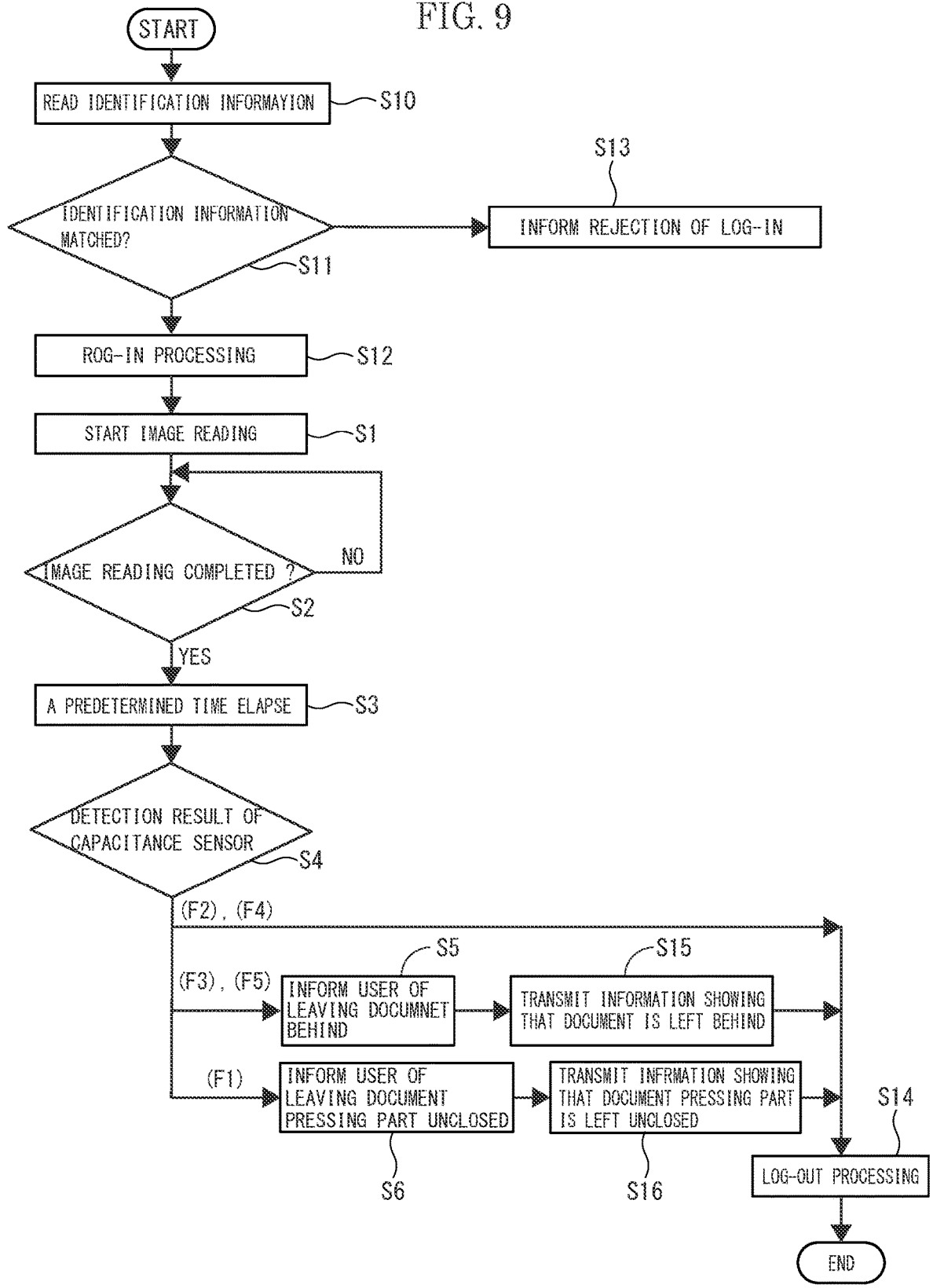
FIG. 9 is a flowchart showing a process for informing that the document is left behind, performed in the image reading system according to the embodiment of the present disclosure.

With reference to FIG. 8 and FIG. 9, the image reading system 9 will be described. FIG. 8 is a block diagram showing the image reading system 9. FIG. 9 is a flowchart showing the process performed in the image reading system 9 to notify an information showing that the user leaves the document M behind.

As shown in FIG. 8, the image reading system 9 includes the image reading device 1B (the image forming apparatus 1), an identification information reading part 50, an authentication part 36, a permission part 37, a communication part 34 and the informing part 35. The identification information reading part 50 is attached to the image forming device 1A or the image reading device 1B, and connected to the interface part 33 of the controller 30. The authentication part 36 and the permission part 37 are implemented by the arithmetic processing part 31 of the controller 30 and the program executed by the arithmetic processing part 31, in the same manner as the informing part 35. The communication part 34 is an element of the controller 30 and is also an element of the image reading system 9.

<The identification information reading part> The identification information reading part 50 is a card reader such as a radio frequency identification (RFID) reader, for example. The identification information reading part 50 reads an identification information different from each user stored in an authentication card 51. The identification information of the authentication card 51 read by the identification information reading part 50 is temporality stored in the storage part 32 of the controller 30. The storage part 32 previously stores an identification information (for determination) of the user, in addition to the identification information of the authentication card 51. The identification information of the user contains the user's name, the user's department, the user's telephone number, the user's extension number, the user's mail address or the like.

<The authentication part> The authentication part 36 authenticates the identification information of the user. Specifically, the authentication part 36 determines whether the identification information of the authentication card 51 matches the identification information previously stored in the storage part 32.

<The permission part> The permission part 37 permits the reading of the document M by the reading part 15 after the authentication by the authentication part 36. Specifically, in a case where the authentication part 36 determines that the identification information of the authentication card 51 matches the identification information of the user, the permission part 37 executes a log-in processing to the image forming apparatus 1 (the image reading device 1B) so that the user can perform the reading of the document M by the reading part 15. The permission part 37 automatically executes a log-out processing from the image forming apparatus 1 when a predetermined requirement (stored in the storage part 32) is satisfied, for example, in a case where a predetermine time elapses after the log-in processing or a case where a predetermined time elapses after the completion of the reading of the document M.

<The communication part> The communication part 34 performs transmission and reception of information between the image reading device 1B and an external device through a network 90. The external device contains the information terminal 91 operated by the user who uses the image forming apparatus 1 (the image reading device 1B) and a male server 92 having a plurality of mail accounts. The mail accounts are set for each user who uses the image forming apparatus 1.

<The informing part> The informing part 35 functions to write the identification information containing the mail address of the log-in user to the mail account through the communication part 34 and functions to read the identification information containing the user's mail address stored in the mail account through the communication part 34. The informing part 35 makes it possible to write the identification information of the user by using simple mail transfer protocol (SMTP). The informing part 35 makes it possible to read the identification information of the user by using post office protocol 3 (POPS).

As described above, the informing part 35 determines a position of the document pressing part 45 and the presence or absence of the document M, based on the detection result of the capacitance sensor 17. The informing part 35 selects one mail address associated with the identification information of the log-in user among the plurality of mail addresses and then transmits information showing that the document M is left behind, to the selected mail address (the transmission destination).

[The notification of the information showing that the document is left behind] With reference to FIG. 9, an operation of the image reading system 9, that is, a notification process of the information showing that the document M is left behind will be described.

Firstly, the user holds his authentication card 51 up the identification information reading part 50. The identification information reading part 50 reads the identification information of the authentication card 51 (step S10), and then the authentication part 36 determines whether the read identification information matches the identification information for determination (step S11). When the identification information match, the permission part 37 executes the log-in processing to the image forming apparatus 1 (the image reading device 1B) (step S12). When the identification information does not match, the authentication part 36 controls the touch panel 18 and the speaker 19 to inform the user that the log-in processing is rejected (step S13).

Next, the user performs the reading operation of the document M, and the controller 30 executes the detecting that the document M is left behind, as described above (steps S1 to S6). The controller 30 executes notifying the information showing that the document M is left behind.

Specifically, in the step S4 where the controller 30 determines that the document M is left behind, based on the detection result, if the detection result shows the capacitance (F2) or the detection result shows the capacitance (F4), the permission part 37 executes the log-out processing from the image forming apparatus 1 (the image reading device 1B) (step S14).

In a case where the detection result shows the capacitance (F3) or the detection result shows the capacitance (F5), the informing part 35 controls the touch panel 18 or the others to inform the user of leaving the document M behind (step S5). The informing part 35 selects the mail address based on the identification information of the log-in user, and the communication part 34 transmits the information showing that the document M is left behind, to the mail address selected by the informing part 35 (step S15). After that, the permission part 37 executes the log-out processing from the image forming apparatus 1 (the image reading device 1B) (step S14).

In a case where the detection result shows the capacitance (F1), the informing part 35 controls the touch panel 18 and the others to inform the user of leaving the document pressing part 45 unclosed (step S6). The informing part 35 selects the mail address based on the identification information of the log-in user, and the communication part 34 transmits the information showing that the user leaves the document pressing part 45 unclosed, to the mail address selected by the informing part 35 (step S16). After that, the permission part 37 executes the log-out processing from the image forming apparatus 1 (the image reading device 1B (step S14). In this case, the process may be completed without informing the user of leaving the document pressing part 45 unclosed and without transmitting the mail.

According to the image reading system 9 according to the above described embodiment, it becomes possible to inform the user who gets away from the image forming apparatus 1 (the image reading device 1B) that the document M is left behind. Thereby, it becomes possible to reduce a risk where a person other than the user who leaves the document M behind takes the document M away.

The image reading system 9 according to the present embodiment performs the informing the user of leaving the document M behind by using the touch panel 18 or the others and the notifying the information showing that the document M is left behind by using an electric mail sending, but the present disclosure is not limited to the above embodiment. It may be possible to eliminate the informing the user of leaving the document M behind by using the touch panel 18 or the others, and to get the notifying the information showing that the document M is left behind by using the electric mail sending as the informing the user of leaving the document M behind.

The image reading device 1B according to the embodiment includes the automatic document conveyance part 16, but the present disclosure is not limited to the above embodiment. For example, the supply tray 46, the discharge tray 47 and the conveyance part 48 may be eliminated and the device main body 2 may contain only the document pressing part 45 in an openable and closable manner (the example is not shown). In this case, the contact glass 40 (the document conveyance face 40A) is also eliminated, and the image forming device 1B is configured to read only the document M on the platen glass 41 (the document placement face 41A).

The image reading device 1B according to the present embodiment is provided with the single capacitance sensor 17, but may be provided two or more capacitance sensors 17.

In the image reading device 1B according to the present embodiment, the controller 30 provided in the image forming apparatus 1 controls various processing, but it is possible that the controller 30 is included in the image reading device 1B. Alternatively, a special controller for controlling the image reading device 1B may be provided, in addition to the controller 30 (the example is not shown).

In the description of the present embodiments, a case where the present disclosure is applied for the image forming apparatus 1 (the multifunctional peripheral) is shown as an example, but the present disclosure is not limited thereto.

The present disclosure may be applied for a copying machine, a facsimile and an image reading exclusive device.

The description of the above embodiment shows one aspect of the image reading device, the image forming apparatus and the image reading system according to the present embodiment, and the technical scope of the present disclosure is not limited to the above embodiment. The present disclosure may be variously modified, substituted or changed within a range without departing from the spirit of technical idea of the present disclosure, and the claims include all embodiments that may be included within the scope of the technical idea.

The invention claimed is:

1. An image reading device comprising:
a reading part which reads an image of a document placed on a document placement face;
a document pressing part openable and closable between a closing position where the document is pressed on the document placement face by the document pressing part and an opening position where the document is permitted to be removed from the document placement face;
a capacitance sensor which is provided in the document pressing part and detects a capacitance varying in response to opening and closing of the document pressing part and presence or absence of the document on the document placement face;
a controller which determines that the document pressing part is disposed in the closing position and that the document is placed on the document placement face, based on a detection result of the capacitance sensor; and
an informing part which informs a user of leaving the document on the document placement face behind in a case where the controller determines that the document placement part is disposed in the closing position and the document is placed on the document placement face after a predetermined time elapses from a completion of an image reading in the reading part.

2. The image reading device according to claim 1, wherein
when it is assumed that a capacitance detected by the capacitance sensor is set to F1 in a state where the document pressing part is disposed in the opening position and the document is not placed on the document placement face,
in a case where a difference between a capacitance detected by the capacitance sensor and the capacitance F1 is within a predetermined range, the controller determines that the document pressing part is disposed in the closing position and the document is not placed on the document placement face behind, and
in a case where a difference between a capacitance detected by the capacitance sensor and the capacitance F1 is smaller than the predetermined range, the controller determines that the document pressing part is disposed in the closing position and the document is left on the document placement face behind.

3. The image reading device according to claim 1, further comprising:
a supply tray on which the document is placed;
a discharge tray disposed on an upper portion of the document pressing part; and
a conveyance part which conveys the document on the supply tray toward the reading part and discharges the document passed through the reading part on the discharge tray, wherein
the capacitance sensor is provided between the document pressing part and the discharge tray, and detects a capacitance varying in response to presence or absence of the document on the discharge tray, and
the informing part informs a user of leaving the document behind in a case where the controller determines that based on a detection result of the capacitance sensor, the document is left on the discharge tray behind after the predetermined time elapses from the completion of the image reading by the reading part.

4. The image reading device according to claim 3, wherein
the controller determines that the document is left on the discharge tray behind in a case where a difference between a capacitance detected by the capacitance sensor at the completion of the image reading by the reading part and a capacitance detected by the capacitance sensor after the predetermined time elapses from the completion of the image reading by the reading part is within a predetermined range.

5. An image forming apparatus comprising:
the image reading device according to claim 1; and
an image forming device which forms an image read by the reading part on a medium.

6. An image reading system comprising:
the image reading device according to claim 1;
an authentication part which authenticates an identification information of a user;
a permission part which permits reading of the document by the reading part after authentication by the authentication part; and
a communication part which performs transmission and reception of an information between the image reading device and an external device through a network, wherein
the informing part causes the communication part to transmit an information showing that the document is left, to a transmission destination associated with the identification information.

* * * * *